United States Patent
Sun et al.

(10) Patent No.: US 9,311,550 B2
(45) Date of Patent: Apr. 12, 2016

(54) DEVICE AND METHOD FOR IMAGE PROCESSING

(71) Applicant: SAMSUNG ELECTRONICS CO., LTD., Suwon-si, Gyeonggi-do (KR)

(72) Inventors: Xun Sun, Beijing (CN); Rong Liu, Beijing (CN); Maolin Chen, Beijing (CN); Fan Zhang, Bangalore (IN); Ji Yeun Kim, Seoul (KR); Lujin Gong, Beijing (CN); Zhilan Hu, Beijing (CN)

(73) Assignee: Samsung Electronics Co., Ltd., Suwon-si (KR)

(*) Notice: Subject to any disclaimer, the term of this patent is extended or adjusted under 35 U.S.C. 154(b) by 0 days.

(21) Appl. No.: 14/197,602

(22) Filed: Mar. 5, 2014

(65) Prior Publication Data

US 2014/0254919 A1  Sep. 11, 2014

(30) Foreign Application Priority Data

Mar. 6, 2013   (CN) ................. 2013 1 0071185
Dec. 30, 2013  (KR) ................. 10-2013-0167543

(51) Int. Cl.
| G06K 9/00 | (2006.01) |
| G06K 9/32 | (2006.01) |
| G06T 7/00 | (2006.01) |
| G06T 7/20 | (2006.01) |

(52) U.S. Cl.
CPC ............ *G06K 9/3233* (2013.01); *G06T 7/0081* (2013.01); *G06T 7/204* (2013.01); *G06T 2207/10028* (2013.01); *G06T 2207/20144* (2013.01)

(58) Field of Classification Search
CPC ........... H04N 5/2226; H04N 2213/005; G06T 7/0071
USPC ......................... 382/187, 103, 236
See application file for complete search history.

(56) References Cited

U.S. PATENT DOCUMENTS

| 7,302,096 | B2 | 11/2007 | Kim | |
| 7,702,131 | B2* | 4/2010 | Chinen et al. | 382/103 |
| 8,073,196 | B2* | 12/2011 | Yuan et al. | 382/103 |
| 2013/0106837 | A1* | 5/2013 | Mukherjee et al. | 345/419 |
| 2013/0286017 | A1* | 10/2013 | Marimon Sanjuan et al. | 345/427 |

FOREIGN PATENT DOCUMENTS

KR   10-2006-0035513   4/2006

* cited by examiner

*Primary Examiner* — Manuchehr Rahmjoo
(74) *Attorney, Agent, or Firm* — NSIP Law

(57) ABSTRACT

A device and a method for image processing include an image processing device that may extract a foreground moving object from a depth map of a three-dimensional (3D) image that may include an image depth map acquirer to obtain the depth map of a successive 3D image over a period of time, a moving object segmenter to segment a moving object from the obtained depth map, and a moving object tracker to identify and track the segmented moving object.

22 Claims, 15 Drawing Sheets

CONNECTED REGIONS OBTAINED BY REGION GROWING

810

DEVICE AND METHOD FOR IMAGE PROCESSING

CROSS-REFERENCE TO RELATED APPLICATIONS

This application claims the priority benefit of Korean Patent Application No. 10-2013-0167543, filed on Dec. 30, 2013, in the Korean Intellectual Property Office, and Chinese Patent Application No. 201310071185.0, filed on Mar. 6, 2013, in the State Intellectual Property Office of The P.R.C., the disclosures of which are incorporated herein by reference.

BACKGROUND

1. Field

One or more embodiments relate to an image processing device and an image processing method for three-dimensional (3D) image processing.

2. Description of the Related Art

Current three-dimensional (3D) application fields, for example, a 3D game, apply technology for identifying each moving object of a moving image, tracking the identified moving object, and controlling different moving objects.

Conventional object segmentation and identification technology may include object identification based on color information and object identification based on depth information. Object identification based on color information may be simply implemented at a low cost, whereas object identification based on depth information may identify and segment an object, for example, a human body object, by combining the color information and the depth information. However, both forms of object identification may require an excessive amount of computation.

SUMMARY

The foregoing described problems may be overcome and/or other aspects may be achieved by one or more embodiments of an image processing device to extract a foreground moving object from a depth map of a three-dimensional (3D) image, which may include an image depth map acquirer to obtain the depth map of a successive 3D image over a period of time, a moving object segmenter to segment a moving object from the obtained depth map, and a moving object tracker to identify and track the segmented moving object.

The moving object segmenter may construct a background model using the obtained depth map, determine an initial seed point of a foreground object, obtain a foreground object region by performing region growing from the initial seed point, obtain an initial region of the moving object by merging a foreground object region belonging to the same moving object among obtained foreground object regions, and obtain a complete region of the moving object by performing precise segmentation on adjacent initial regions of the moving object exhibiting a complex motion.

The moving object segmenter may gather a floor point based on a depth difference in a perpendicular direction of the obtained depth map and remove a background using a floor model on which modeling is performed based on the gathered floor point.

The moving object segmenter may construct the background model based on a greatest depth value and a depth value range of a pixel of the obtained depth map and select the pixel as the initial seed point when a difference between the greatest depth value and a smallest depth value of the pixel is less than a predetermined first threshold, and a difference, "Diff(p)," between a depth value of the pixel, "depth(p)," and the background model is greater than a predetermined second threshold. Here, the difference between the depth value of the pixel and the background model may be represented by Diff (p)=|[depth(p)−MIN_$D_{BG(p)}$]|. Here, "MIN_$D_{BG(p)}$" may denote the smallest depth value of the pixel, "p."

The moving object segmenter may identify an additional initial seed point by constructing the background model by indicating a bad pixel based on the obtained depth map.

The moving object segmenter may indicate a pixel as the bad pixel when the pixel lacks a valid depth value in a number of successive frames including the pixel and select a pixel as the initial seed point by restoring the pixel to be a foreground pixel point when the pixel indicated as the bad pixel is covered by a valid foreground pixel in one of the successive frames.

The moving object segmenter may perform the region growing from a growing pixel point, "$x_i$," to an adjacent pixel point, "$x_{i+1}$," which is adjacent to the growing pixel point $x_i$, when a difference between a depth value of $x_{i+1}$ and a depth value of $x_i$ is less than a predetermined third threshold, a greatest depth grayscale between $x_i$ and $x_{i+1}$ is less than a predetermined fourth threshold, and an accumulated depth difference on a growing route from $x_i$ to $x_{i+1}$ is less than a predetermined fifth threshold.

The moving object segmenter may reduce the third threshold, the fourth threshold, and the fifth threshold, and perform the region growing when $x_i$ and $x_{i+1}$ are verified to be in a static state and different moving objects.

The moving object segmenter may identify a portion of the moving object based on each of the initial regions of the moving object adjacent to one another, without actually being in contact, perform the region growing repeatedly by reducing a set of the third threshold, the fourth threshold, and the fifth threshold until initial regions of different moving objects are obtained, and obtain the initial region of the moving object by merging an initial region belonging to the same moving object among the obtained initial regions.

The moving object segmenter may extract the moving object from the depth map of the successive 3D image over the period of time obtained by the image depth map acquirer, obtain an additional depth map, and accumulate and extract a new moving object based on the obtained additional depth map.

The foregoing described problems may be overcome and/or other aspects may be achieved by one or more embodiments of an image processing method of extracting a foreground moving object from a depth map of a 3D image, which may include obtaining the depth map of a successive 3D image over a period of time, segmenting a moving object from the obtained depth map, and identifying and tracking the segmented moving object.

The segmenting may include constructing a background model using the obtained depth map, determining an initial seed point of a foreground object, obtaining a foreground object region by performing region growing from the initial seed point, obtaining an initial region of the moving object by merging a foreground object region belonging to the same moving object among obtained foreground object regions, and obtaining a complete region of the moving object by performing precise segmentation on adjacent initial regions of the moving object exhibiting a complex motion.

The constructing of the background model and the determining of the initial seed point may include gathering a floor point based on a depth difference in a perpendicular direction of the obtained depth map and removing a background using a floor model on which modeling is performed based on the gathered floor point.

The constructing of the background model and the determining of the initial seed point may include constructing the background model based on a greatest depth value and a depth value range of a pixel of the obtained depth map and selecting the pixel as the initial seed point when a difference between the greatest depth value and a smallest depth value of the pixel is less than a predetermined first threshold and a difference, "Diff(p)," between a depth value of the pixel, "depth(p)," and the background model is greater than a predetermined second threshold. Here, the difference between the depth value of the pixel and the background model may be represented by Diff(p)=|[depth(p)−MIN_$D_{BG(p)}$]|. Here, "MIN_$D_{BG(p)}$," may denote the smallest depth value of the pixel, "p."

The constructing of the background model and the determining of the initial seed point may include identifying an additional initial seed point by constructing the background model by indicating a bad pixel based on the obtained depth map.

The identifying of the additional initial seed point may include indicating a pixel as the bad pixel when the pixel lacks a valid depth value in a number of successive frames including the pixel and selecting a pixel as the initial seed point by restoring the pixel to be a foreground pixel point when the pixel indicated as the bad pixel is covered by a valid foreground pixel in one of the successive frames.

The obtaining of the foreground object region may include performing the region growing from a growing pixel point, "$x_i$," to an adjacent pixel point, "$x_{i+1}$," which is adjacent to the growing pixel point $x_i$, when a difference between a depth value of $x_{i+1}$ and a depth value of $x_i$ is less than a predetermined third threshold, a greatest depth grayscale between $x_i$ and $x_{i+1}$ is less than a predetermined fourth threshold, and an accumulated depth difference on a growing route from $x_i$ to $x_{i+1}$ is less than a predetermined fifth threshold.

The performing of the region growing from the growing pixel point $x_i$ to the adjacent pixel point $x_{i+1}$ may include reducing the third threshold, the fourth threshold, and the fifth threshold, and performing the region growing when $x_i$ and $x_{i+1}$ are verified to be in a static state and different moving objects.

The obtaining of the complete region may include identifying a portion of the moving object based on each of the initial regions of the moving object adjacent to one another, without actually being in contact, performing the region growing repeatedly by reducing a set of the third threshold, the fourth threshold, and the fifth threshold until initial regions of different moving objects are obtained, and obtaining the complete region of the moving object by merging an initial region belonging to the same moving object among the obtained initial regions.

The image processing method may further include obtaining an additional depth map based on data obtained by identifying and tracking the segmented moving object from the obtained depth map, and accumulating and extracting a new moving object based on the obtained additional depth map.

Additional aspects and/or advantages of one or more embodiments will be set forth in part in the description which follows and, in part, will be apparent from the description, or may be learned by practice of one or more embodiments of disclosure. One or more embodiments are inclusive of such additional aspects.

BRIEF DESCRIPTION OF THE DRAWINGS

These and/or other aspects will become apparent and more readily appreciated from the following description of embodiments, taken in conjunction with the accompanying drawings of which.

DETAILED DESCRIPTION

Figure 1A:
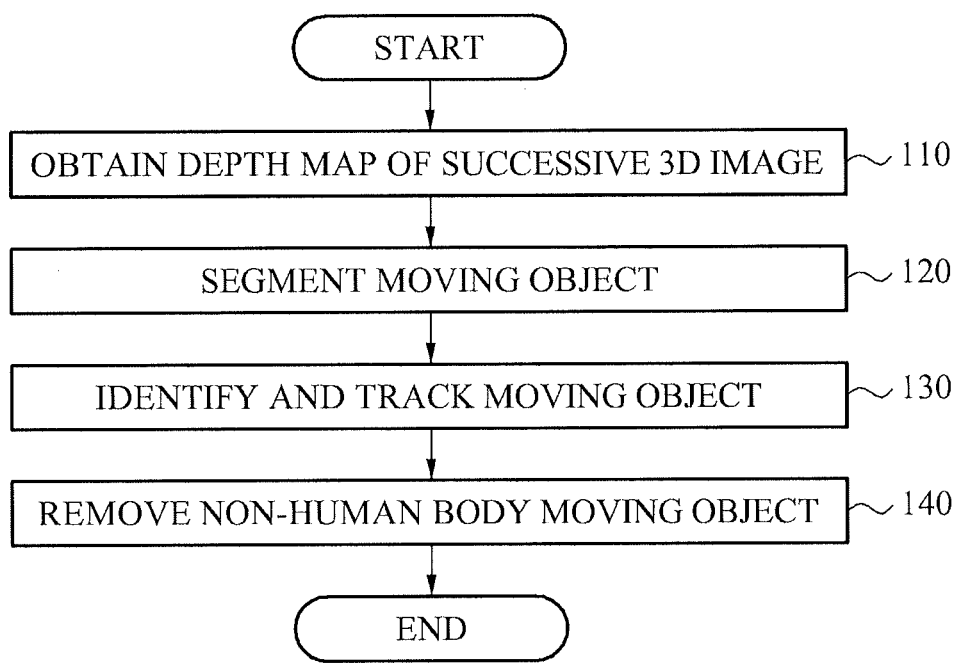
FIGS. 1A through 1C illustrate an image processing method according to one or more embodiments.

Reference will now be made in detail to one or more embodiments, illustrated in the accompanying drawings, wherein like reference numerals refer to like elements throughout. In this regard, embodiments of the present invention may be embodied in many different forms and should not be construed as being limited to embodiments set forth herein, as various changes, modifications, and equivalents of the systems, apparatuses and/or methods described herein will be understood to be included in the invention by those of ordinary skill in the art after embodiments discussed herein are understood. Accordingly, embodiments are merely described below, by referring to the figures, to explain aspects of the present invention.

According to one or more embodiments, a depth map of a three-dimensional (3D) image may include a two-dimensional (2D) pixel matrix sign of the image. Here, each pixel may correspond to each position in the image and include a pixel value indicating a distance between an arbitrary reference position and the position in the image. Thus, the depth map may express feature information of a target in the image, rather than brightness and color information. PCT International Application No. WO 2007/043035A1 discloses a method of generating a depth map of an image.

Here, the depth map may include information associated with a distance from a surface of an object featured in the 3D image to a time point at which the 3D image is obtained.

According to one or more embodiments, the depth map may be used to segment the object in the image. For example, an image processing device and method that may identify, segment, and track a moving object based on the depth map of the 3D image, without combining colors, may be provided.

The image processing device and method according to one or more embodiments may construct a background model based on a depth map of a successive 3D image, determine an initial seed point, segment a moving object by performing region growing, identify and track the segmented moving object, and extract a foreground moving object.

Here, the moving object may refer to an object that dynamically moves in the successive 3D image. For example, the moving object may include objects associated with a human being, an animal, and other moving entities. Also, the initial seed point may indicate a point on the depth map corresponding to a pixel, p, from which the region growing is determined to start.

Also, the background model may refer to a model in which a background shape is recorded. For example, the background model may include a multi-sample based geometry model and a bad pixel model. The multi-sample based geometry model may be referred to as a sample-based geometry background model. Here, an image processing system according to one or more embodiments may construct two background models and thus, stable image processing may be performed even in an environment in which a significant amount of noise is present.

Figure 1B:
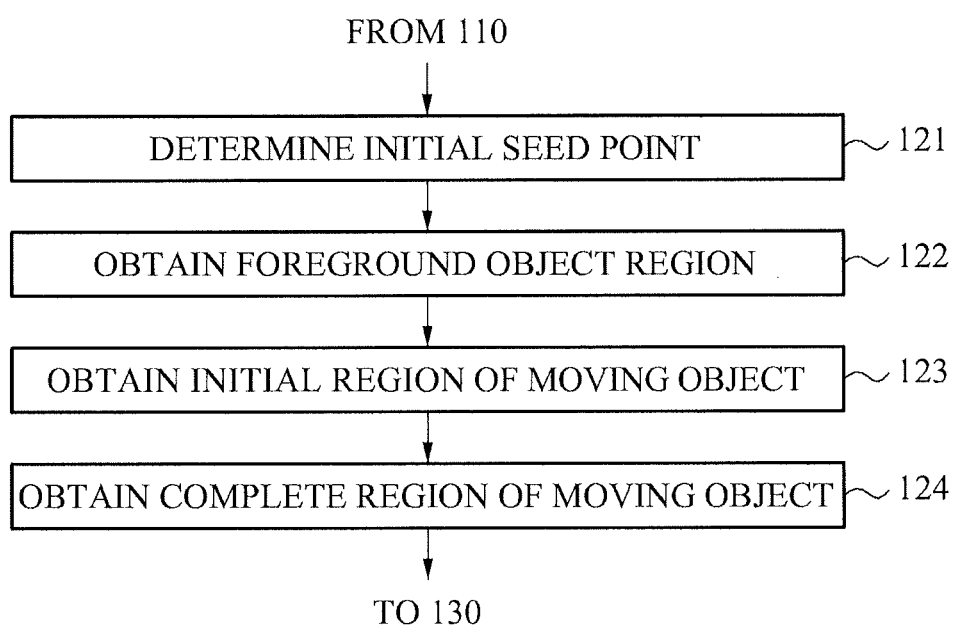
Figure 1C:
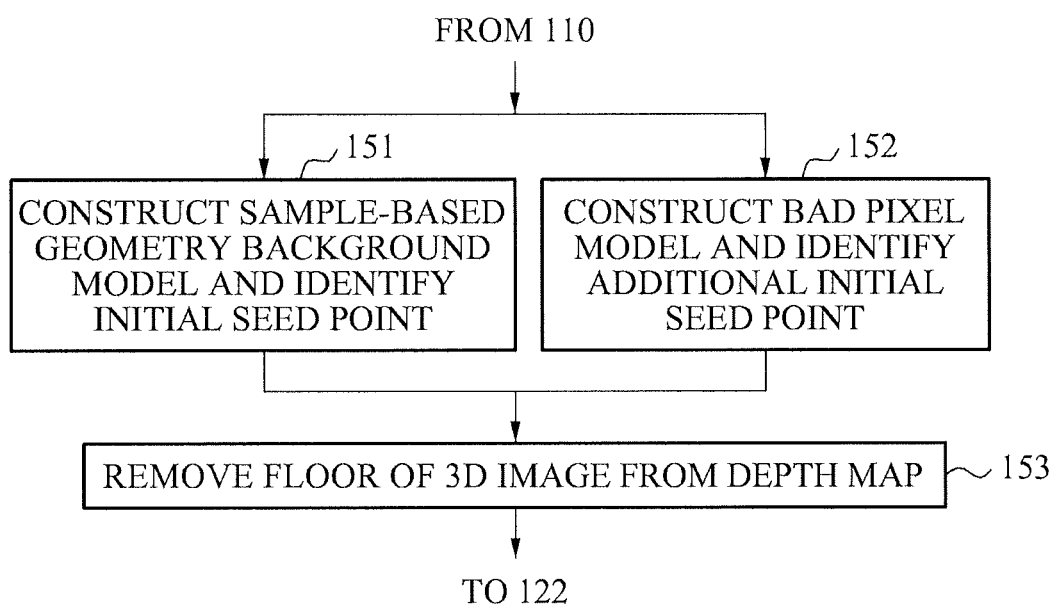

FIGS. 1A through 1C illustrate an image processing method according to one or more embodiments.

Referring to FIG. 1A, in operation 110, an image processing device may obtain a depth map of a successive 3D image over a period of time. Here, the depth map of the 3D image may be generated based, for example, on a method published in the aforementioned PCT Application or by other general methods of generating a depth map. According to one or more embodiments, the depth map may be obtained by a depth map generating device or program. However, the obtaining of the depth map may not be limited to the device or program described in the foregoing, but the depth map may be obtained using other devices or programs.

In operation 120, the image processing device may segment a moving object from the obtained depth map. Here, operation 120 may include detailed operations, for example, operations 121 through 124, which will be described in the following with reference to FIG. 1B.

In operation 130, the image processing device may identify and track the segmented moving object. For example, when a complete region of each moving object is segmented in operation 120, the image processing device may identify and track the segmented moving object. A detailed description of the identifying and tracking operation will be provided with reference to FIG. 6.

In operation 140, the image processing device may remove a non-human body moving object. For example, the image processing device may extract a human body object from the identified moving object by removing the non-human body moving object. A detailed description of the extracting operation will be provided with reference to FIG. 7.

FIG. 1B is a flowchart illustrating a method of segmenting a moving object according to one or more embodiments.

In operation 121, an image processing device may determine an initial seed point. For example, the image processing device may construct a background model using an obtained depth map and determine the initial seed point of a foreground object. A detailed process of operation 121 will be provided with reference to FIG. 1C.

Here, the foreground object may indicate an object exhibited in the foreground of the depth map.

In operation 122, the image processing device may obtain a foreground object region. For example, the image processing device may perform region growing from the initial seed point to obtain the foreground object region. A detailed process of performing the region growing will be provided with reference to FIG. 3.

Here, the foreground object region may indicate a region occupied by the foreground object in the depth map.

In operation 123, the image processing device may obtain an initial region of the moving object. For example, the image processing device may merge a foreground object region belonging to the same moving object among foreground object regions. Here, initial regions of the moving object may exhibit a complex motion due to moving objects being adjacent to one another.

Here, the initial regions may indicate regions into which connected foreground object regions, among the foreground object regions obtained through the region growing performed with respect to the moving object, are merged.

In operation 124, the image processing device may obtain a complete region of the moving object. For example, the image processing device may perform precise segmentation on the initial regions of the moving object and obtain the complete region of the moving object. A detailed description of a process of obtaining the complete region of the moving object will be provided with reference to FIGS. 5A through 5D.

FIG. 1C is a flowchart illustrating a method of determining an initial seed point according to one or more embodiments.

According to one or more embodiments, operation 121 of FIG. 1B may include operations 151 through 153.

In operation 151, an image processing device may construct a sample-based geometry background model and identify the initial seed point. For example, the image processing device may construct, using the obtained depth map, the sample-based geometry background model in which a background shape is recorded and identify the initial seed point. A detailed description of a process of constructing the sample-based geometry background model will be provided with reference to FIG. 2.

In operation 152, the image processing device may construct a bad pixel model and identify an additional seed point. For example, the image processing device may construct the bad pixel model based on the obtained depth map and identify the additional initial seed point. Here, the bad pixel model may refer to a model indicating a bad pixel. The bad pixel may indicate a pixel having an invalid depth value due to, for example, illumination, material, and matching ambiguity. In general, the bad pixel may be exhibited in a static background object.

In operation 153, the image processing device may remove a background of a 3D image from the depth map. For example, the image processing device may construct a floor model based on the obtained depth map and remove the background of the 3D image from the depth map.

Figure 2:
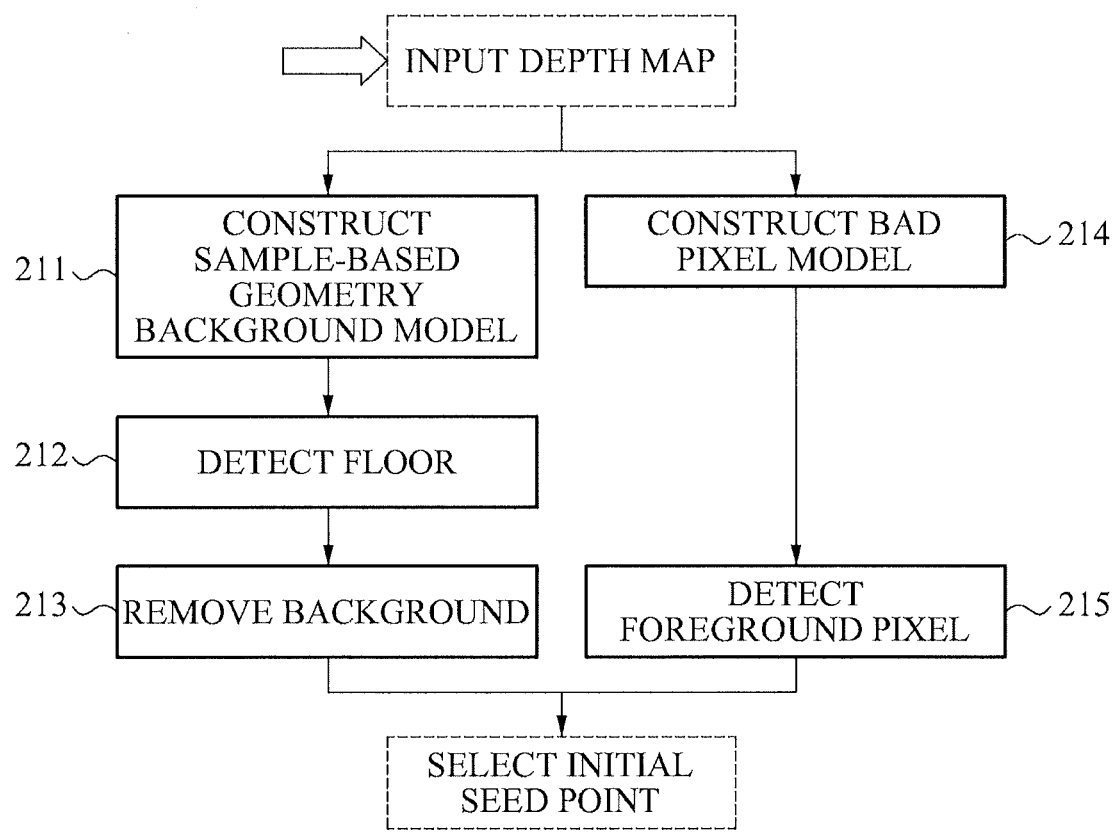
FIG. 2 illustrates a method of processing an initial seed point to perform region growing in an image processing method according to one or more embodiments.

FIG. 2 illustrates a method of processing an initial seed point to perform region growing in an image processing method according to one or more embodiments.

Referring to FIG. 2, in operation 110 of FIG. 1A, an image processing device may construct, using the obtained depth map, a background model in which a background shape is recorded and identify the initial seed point.

In operation 211, the image processing device may construct a sample-based geometry background model. A detailed description of constructing the sample-based geometry background model is provided as follows.

For example, to construct the sample-based geometry background model, the image processing device may extract a greatest depth value, "$D_{BG}(p)$," of each pixel, "p," from a successive depth map and extract a background. Here, the greatest depth value may be represented by $D_{BG}(p) = \mathrm{MAX}(\mathrm{depth}(p), D_{BG}(p))$.

In a case of using only a sample with the greatest depth value as the background for the sample-based geometry background model, image processing may not be easily performed when the 3D image is obtained in an environment in which a substantial amount of noise is present. Thus, the image processing device may record a background depth of each pixel p, and obtain a depth value range, "[MIN_$D_{BG}$(p),MAX_$D_{BG}$(p)]," of each pixel p. Here, "MAX_$D_{BG}$(p)" and "MIN_$D_{BG}$(p)" may denote the greatest depth value and the smallest depth value of the pixel p, respectively. Whether the pixel p corresponds to the background based on the depth value range of the pixel p may be re-estimated.

When a depth between a background depth at a point corresponding to the pixel p, and the pixel p is greater than or equal to a predetermined depth, the image processing device may select the pixel p as the initial seed point. For example, when a difference between the greatest depth value and the smallest depth value of the pixel p is less than a predetermined first threshold, and a difference, "Diff(p)," between an arbitrary depth value, "depth(p)," of the pixel p, and the sample-based geometry background model is greater than a predetermined second threshold, the image processing device may select the pixel p as the initial seed point. Here, the difference, Diff(p), between the arbitrary depth value of the pixel p, "depth(p)," and the sample-based geometry background model may be represented by Diff(p)=|[depth(p)−MIN_$D_{BG}$(p)]|.

However, when the difference between the greatest depth value and the smallest depth value of the pixel p is greater than the predetermined first threshold, the sample-based geometry background model of the pixel p may be re-estimated.

In operation 212, the image processing device may detect a floor with respect to the sample-based geometry background model. For example, the image processing device may perform modeling on the floor as a 3D plane based on a 3D plane equation, for example, a*X+b*Y+c*Z+d=0. Here, the 3D plane equation may indicate a horizontal plane, for example, a floor, in an image. For example, a 3D points set, $X_i$, in one floor, may be indicated as "$\{x_i,y_i,z_i\}$." Here, $\{x_i,y_i,z_i\}$ may satisfy the 3D plane equation. Also, "a","b", and "c" may denote coefficients predetermined to allow the 3D plane equation to correspond to an arbitrary plane.

More particularly, the image processing device may gather a floor point at which a depth difference in a perpendicular direction from the bottom of the depth map exceeds a predetermined threshold. Also, the image processing device may use a random sample consensus (RANSAC) method to fit the gathered floor point to a*X+b*Y+c*Z+d=0.

In operation 213, the image processing device may remove the background based on a floor model on which modeling is performed. Here, foreground objects in the depth map from which the background is removed may correspond to other moving objects independent from one another.

In operation 214, the image processing device may construct a bad pixel model. For example, a region in which a bad pixel is exhibited may be a region that may lack a valid depth due to illumination, material, and matching ambiguity when obtaining a 3D image. In general, the region lacking the valid depth, for example, the region in which the bad pixel is exhibited, may be present in a background object in a static state. Based on such characteristics, the image processing device may construct the bad pixel model. Here, the bad pixel model may indicate the bad pixel.

For example, when the pixel p lacks the valid depth value during a predetermined number of successive frames including the pixel p, the image processing device may indicate the pixel p as the bad pixel based on the bad pixel model. Here, the valid depth and the valid depth value may indicate a valid depth and a valid depth value in an obtained 3D image, for example, a depth and a depth value indicating that an estimated value is in a non-saturation state.

In operation 215, the image processing device may detect a foreground pixel. When the pixel p indicated as the bad pixel is covered by a valid foreground pixel in one of the successive frames, for example, when a depth value of the pixel p, "Depth(p)," is represented by Depth(p)∈[MIN_$D_{BG}$(p), MAX_$D_{BG}$(p)], the image processing device may detect the foreground pixel by restoring the pixel p to be the foreground pixel. Here, a pixel at a point at which the pixel is restored to be the foreground pixel may be selected as the initial seed point. Here, the foreground pixel may indicate a pixel corresponding to a moving object exhibited in the foreground of the depth map. The valid foreground pixel may indicate a pixel having the valid depth value in one of the successive frames.

Here, the indication of whether the pixel p is the bad pixel may have reversibility. For example, the valid foreground pixel may be the bad pixel at a position based on a movement of the moving object and a change of the background in a successive image. Also, the indicated bad pixel may be the foreground pixel. More particularly, when a pixel indicated as the bad pixel indicates the valid depth value in a different frame, the pixel may be eliminated from the bad pixel model.

Also, the image processing device may obtain the additional initial seed point by detecting the foreground pixel in operation 215 based on the bad pixel model constructed in operation 214.

FIGS. 3 through 9 illustrate examples of an image processing method according to one or more embodiments.

Figure 3:
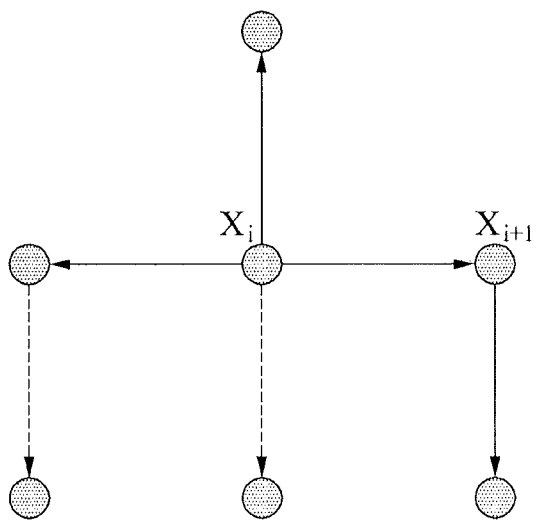
FIG. 3 illustrates region growing in an image processing method according to one or more embodiments.

FIG. 3 illustrates region growing in an image processing method according to one or more embodiments.

In operation 122 of FIG. 1B, an image processing device may obtain a foreground object region by performing the region growing from an initial seed point. For example, the image processing device may perform the region growing from each initial seed point based on at least one of a depth of a pixel, a grayscale, time information, an accumulated depth difference on a growing route.

In a case of the region growing performed from the initial seed point in operation 122, the region growing with respect to an arbitrary growing pixel point, "$x_i$," and an adjacent pixel point, "$x_{i+1}$," which is adjacent to the arbitrary growing pixel point, $x_i$, is illustrated in FIG. 3. For example, when a difference between a depth value of $x_{i+1}$ and a depth value of $x_i$ is less than a predetermined third threshold, a greatest grayscale between $x_i$ and $x_{i+1}$ is less than a predetermined fourth threshold, and an accumulated depth difference on a route through which $x_i$ is grown into $x_{1+1}$ is less than a predetermined fifth threshold, the image processing device may perform the region growing from the growing pixel point, $x_i$, to the adjacent pixel point, $x_{i+1}$. For example, the region growing may be similar to a breadth-first search (BFS) algorithm.

However, when $x_i$ and $x_{i+1}$ are verified to be in a static state and different moving objects, the image processing device may control the region growing using a stricter threshold, for example, a reduced threshold. For example, when $x_i$ and $x_{i+1}$ are verified to be in a relatively static state and different moving objects, the image processing device may reduce the third threshold, the fourth threshold, and the fifth threshold and perform the region growing.

Figure 4:
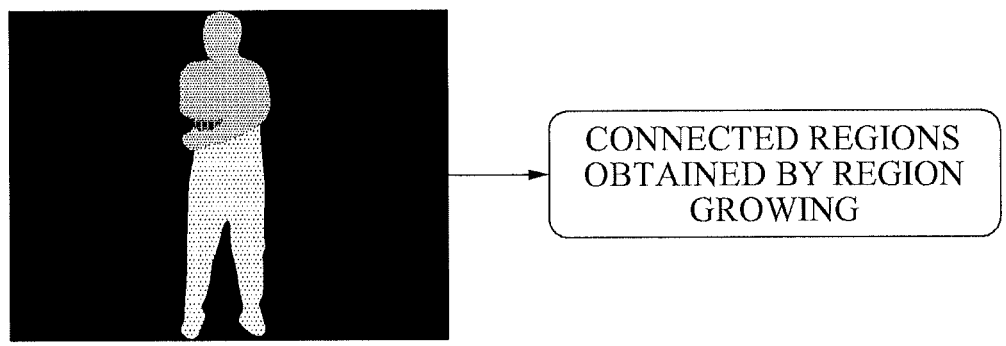
FIG. 4 illustrates a process of obtaining connected regions through region growing from an initial region in an image processing method according to one or more embodiments.

FIG. 4 illustrates a process of obtaining connected regions through region growing from an initial region in an image processing method according to one or more embodiments.

As shown in FIG. 4, when an image processing device obtains the initial region of a moving object in operation 123 of FIG. 1B, the image processing device may project pixels sets of two foreground object regions belonging to the same moving object on an XY plane and an XZ plane. Also, the image processing device may calculate a Euclidean distance between the two pixels sets and an overlapping area and compare the calculated distance and the area to predetermined thresholds, and determine whether to merge the two foreground object regions. Here, the pixels sets may indicate a set of pixels included in a foreground object region.

Here, when each pixels set is projected on each plane, the pixels set projected on the XY plane and the XZ plane may be indicated as an A set and a B set. Here, the image processing device may calculate a Hausdorff distance between the A and B sets. As described in the foregoing, the image processing device may compare the calculated Hausdorff distance to a predetermined threshold. When the Hausdorff distance is less than the predetermined threshold, the image processing device may merge the two foreground object regions. For example, the Hausdorff distance between the two sets, A and B, may be represented by $D(A,B)=MAX_{a \in A}\{MAX_{b \in B} \{Distance\_Euclidean (a,b)\}\}$.

Also, the image processing device may calculate the overlapping area between the two sets, A and B, using a bounding box. For example, when the overlapping area with respect to the Hausdorff distance is greater than a predetermined threshold, the image processing device may merge the two foreground object regions. For another example, when a smaller foreground object region of the two foreground object regions is positioned within a convex hull of a greater foreground object region, the image processing device may merge the two foreground object regions.

Also, the image processing device may analyze limbs in the two foreground object regions connected to one another. For example, when the smaller foreground object region has a high motion value or was previously detected as belonging to the same moving object in the greater foreground object region, the image processing device may merge the two foreground object regions.

FIGS. 5A through 5D illustrate a process of extracting a human body object region according to one or more embodiments.

Figure 5A:
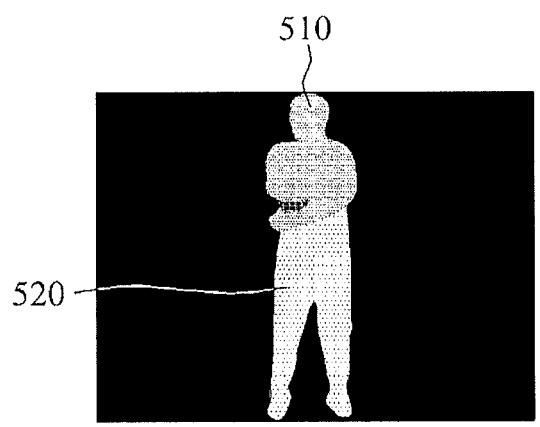
FIGS. 5A through 5D illustrate a process of extracting a human body object region according to one or more embodiments.
Figure 5B:
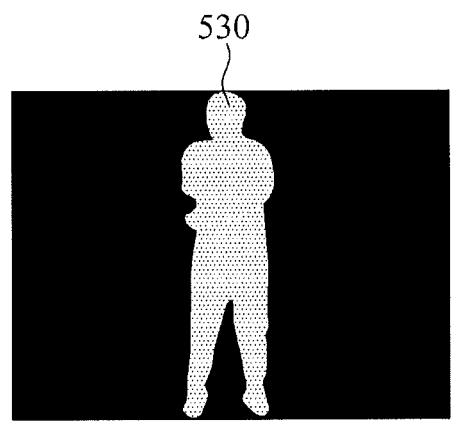

FIG. 5A illustrates two foreground object regions of one human body object according to one or more embodiments. FIG. 5B illustrates a moving object region in which two foreground object regions of one human body object are merged according to one or more embodiments.

Here, each of the two foreground object regions may be indicated as a first foreground object region 510 and a second foreground object region 520. However, a foreground object region may not be limited to such regions, and at least one foreground object region may be present in an obtained depth map.

For example, as illustrated in operation 123 of FIG. 1B, an image processing device may merge the first foreground object region 510 of FIG. 5A and the second foreground object region 520 of FIG. 5A to form one moving object region 530, for example, a human body object region, of FIG. 5B. Here, in a field of object identification technology, the image processing device may apply various merging technologies to foreground object regions belonging to the same moving object. The moving object region 530 may indicate an initial region of a moving object.

For another example, the image processing device may detect whether a smaller foreground object region among foreground object regions connected to one another has a high motion value or is already the same moving object. In this case, the image processing device may perceive the small foreground object region as moving limbs of a large foreground object region and merge the small and large foreground object regions.

For still another example, in operation 123 of FIG. 1B, the image processing device may obtain initial regions of a moving object that are adjacent to one another, without actually being in contact, using a depth map. In operation 124 of FIG. 1B, the image processing device may obtain a complete region of each moving object.

In operation 124, the image processing device may identify, among the initial regions of the moving object, an initial region corresponding to a portion of the moving object. For example, the portion of the moving object may be indicated as a small initial region. Here, in operation 122 of FIG. 1B, initial regions of different moving objects may be obtained by repeatedly performing region growing after reducing a third threshold, a fourth threshold, and a fifth threshold. For example, similar to operation 123 of FIG. 1B, the image processing device may obtain the complete region of the moving object by merging the small initial region with the large initial region, which may be referred to as a region re-growing process.

Figure 5C:
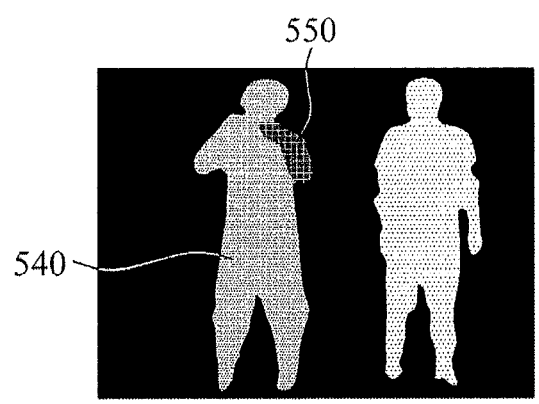
Figure 5D:
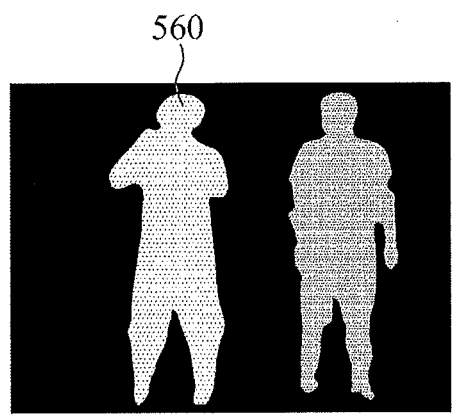

As shown in FIG. 5C, an image processing device may perform region growing on initial regions of two moving objects, for example, human body objects, which are actually separated from one another. Through the region growing performed on the initial regions, the image processing device may obtain a complete region of the two separated moving objects, for example, the human body objects, as shown in FIG. 5D. Here, the number of the moving objects is not limited to two, and at least one moving object may be present in a depth map.

FIG. 5C illustrates two initial regions of the same human body object in which a human body object region on a left side of the body is shaded differently. Referring to FIG. 5C, each of the two initial regions of the same human body may be indicated as a first initial region 540 and a second initial region 550. The first initial region 540 and the second initial region 550 may be adjacent to each other, without actually being in contact. Also, the first initial region 540 and the second initial region 550 may not be grown into one region due to a change in edge depth. Here, a shade may correspond to a masking assigned to different moving objects.

Here, similar to operation 123 of FIG. 1B, the image processing device may perform the region growing using a stricter threshold, for example, a reduced threshold. Through such region growing, the image processing device may merge the first initial region 540 with the second initial region 550 to be one human body object region 560 on the left side of FIG. 5D.

Figure 6:
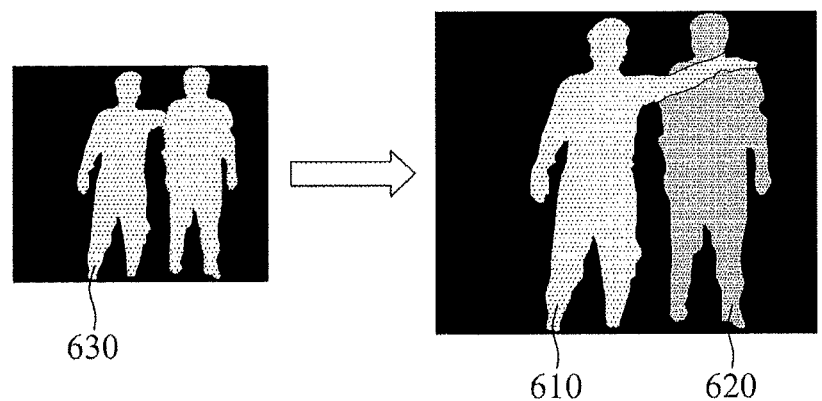
FIG. 6 illustrates an image processing method used when moving objects are connected to one another according to one or more embodiments.

FIG. 6 illustrates an image processing method used when moving objects are connected to one another according to one or more embodiments.

According to one or more embodiments, an initial region of the moving objects may be connected. For example, the moving objects may be physically connected to one another. Here, an image processing device may perform matching on the initial region 630 of the moving objects connected to one another and other initial regions of moving objects.

Also, the image processing device may perform clustering on a static point in each initial region using a clustering method, for example, a K-means algorithm. Through the clustering, the image processing device may separate the initial region 630 of the moving objects connected to one another and other initial regions of moving objects, and obtain a complete region of each moving object.

As shown in FIG. 6, the image processing device may perform precise segmentation on the initial region 630 of the two moving objects connected to each other, for example, human body objects, and obtain the complete region of the two moving objects. Referring to FIG. 6, the complete region of each moving object may be indicated as a first complete region 610 and a second complete region 620.

For example, when the first complete region 610 and the second complete region 620 of the moving objects are segmented in operation 120 of FIG. 1A, the image processing device may identify and track the segmented moving objects in operation 130 of FIG. 1A.

For example, the image processing device may identify and track the moving objects using a conventional object identifying and tracking technology for image processing.

Here, the image processing device may indicate the same masking for the same moving object, for example, a human body or other objects, in every scene and frame. Also, the image processing device may indicate the same masking for moving objects merged into the complete region of the moving objects. Also, the image processing device may perform operation 120 of FIG. 1A on a newly identified moving object, and segment a complete region of the new moving object. A detailed description will be provided with reference to FIG. 7.

Figure 7:
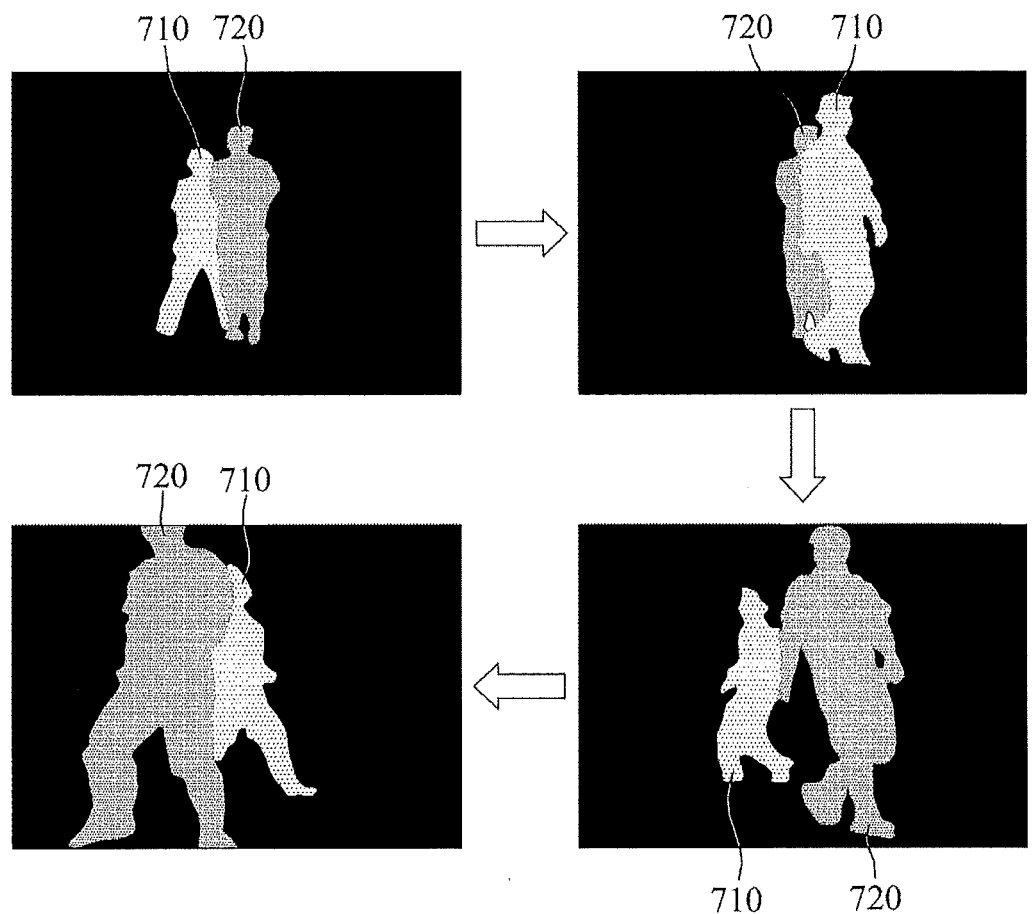
FIG. 7 illustrates an example of tracking a moving object according to one or more embodiments.

FIG. 7 illustrates an example of tracking a moving object according to one or more embodiments.

According to one or more embodiments, a first moving object 710, for example, a human body object, and a second moving object 720, for example, a human body object, may be different moving objects.

For example, an image processing device may maintain the same identification (ID) with respect to the same moving object in each scene. For example, the image processing device may perform mask matching on a moving object to maintain the ID. Subsequently, the image processing device may label the ID by performing an image processing process on a new moving object. Also, the image processing device may label the ID to a user merged with the same mask.

The image processing device may extract a moving object from a depth map of a successive 3D image by performing operations 110 through 130 of FIG. 1A. Here, the moving object may be positioned relatively in a foreground rather than in a background and thus, indicated as a foreground moving object.

Also, the image processing device may perform operation 140 of FIG. 1A. In operation 140, the image processing device may extract a human body object by removing a moving object which is not a human body from the indicated moving object. For example, the image processing device may identify the human body using conventional technology for detecting a human body portion and a human body motion. The image processing device may remove the moving object which is not an identified human body from the indicated moving object.

Also, when indicating an extracted human body object, the image processing device may indicate different extracted human body objects through the use of different colors, shades, patterns, etc. For example, when "n" human body objects are present, the image processing device may indicate the n human body objects using "n" colors, shades, patterns, etc. Here, "n" denotes a natural number greater than or equal to "1." The n colors, shades, patterns, etc. may correspond to "n" IDs and "n" maskings.

According to one or more embodiments, an image processing method may include obtaining data by accumulating and extracting a moving object, for example, a human body object, by the image processing device, and performing operations 120 through 130 of FIG. 1A on a depth map of a successive 3D image over a period of time. Here, the image processing device may obtain an additional depth map by performing operations 110 through 130 of FIG. 1A, and accumulate and extract a new moving object, for example, a human body object. Here, when the human body object is included in moving objects, the image processing device may additionally perform operation 140 of FIG. 1A.

In the image processing method, color information of an image may not be used, but only the depth map of the successive 3D image may be used to extract a foreground moving object from the 3D image. The image processing device may use only the depth map of the successive 3D image and thus, precise and stable 3D image processing may be performed even in an environment in which a significant amount of noise is present.

Figure 8:
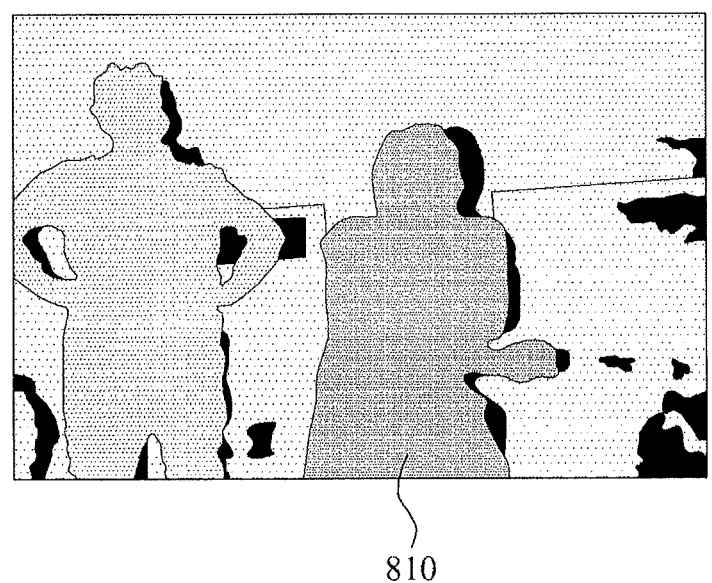
FIGS. 8 and 9 illustrate results of extracting a human body object from an image of a complex indoor office environment using an image processing method according to one or more embodiments.
Figure 9:
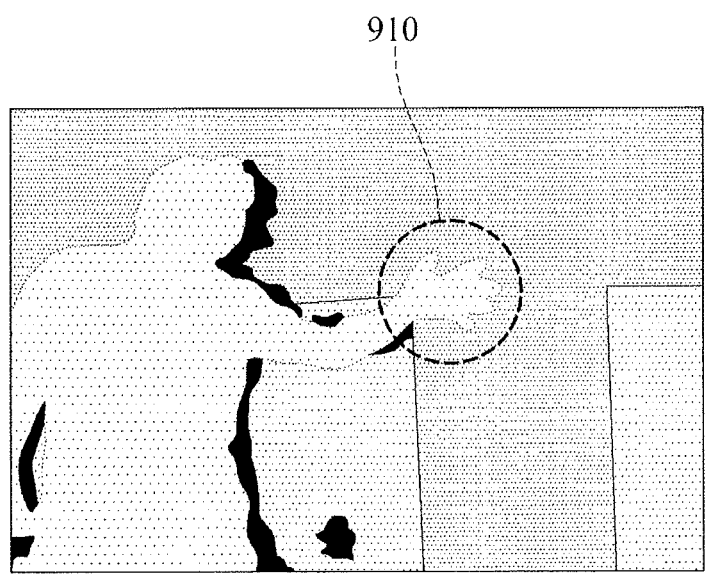

FIGS. 8 and 9 illustrate results of extracting a human body object from an image of a complex indoor office environment using an image processing method according to one or more embodiments.

An image processing device may extract a complete region of the human body object by merging regions.

For example, in an environment in which a distance between a human body and a background is narrow and a vast amount of noise data is present, conventional technology may divide a body of the human body object shown on the right side of FIG. 8 into two regions based on arms. However, as shown in FIG. 8, the image processing device according to one or more embodiments may extract one complete region 810 from the human body object on the right side of FIG. 8 even in an environment in which a distance between a human body and a background is narrow, and a vast amount of noise data is present.

For another example, as shown in FIG. 9, the image processing device may precisely restore an edge region 910, for example, fingers, of 3D depth data.

Figure 10:
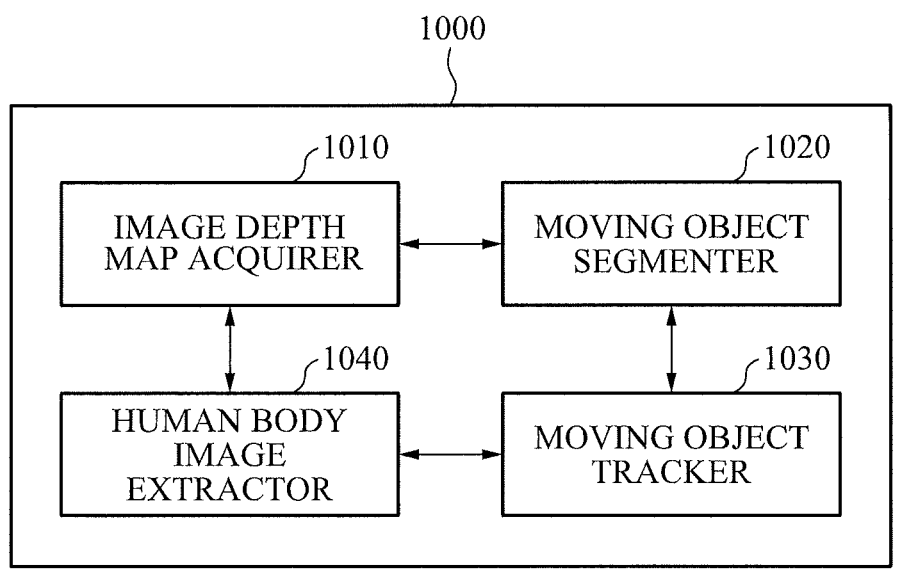
FIG. 10 illustrates a configuration of an image processing device according to one or more embodiments.

FIG. 10 illustrates a configuration of an image processing device 1000 according to one or more embodiments.

The image processing device 1000 may include an image depth map acquirer 1010, a moving object segmenter 1020, a moving object tracker 1030, and a human body image extractor 1040.

The image depth map acquirer 1010 may obtain a depth map of a successive 3D image over a period of time.

The moving object segmenter 1020 may segment a moving object from the obtained depth map. A detailed description is provided in the following.

The moving object tracker 1030 may identify and track the segmented moving object.

The human body image extractor 1040 may remove a non-human body moving object from the identified moving object and extract the human body object. According to one or more embodiments, the human body image extractor 1040 may perform flagging on the non-human body moving object.

When segmenting the moving object from the obtained depth map, the moving object segmenter 1020 may construct a background model using the obtained depth map, determine an initial seed point of a foreground object, perform region growing from the initial seed point, and obtain a foreground object region. Also, the moving object segmenter 1020 may obtain an initial region of the moving object by merging foreground object regions belonging to the same moving object. The moving object segmenter 1020 may perform precise segmentation on adjacent initial regions of the moving object exhibiting a complex motion and obtain a complete region of the moving object.

The moving object segmenter 1020 may construct a sample-based geometry background model based on a greatest depth value and a depth value range of a pixel of the obtained depth map. When a difference between the greatest depth value and a smallest depth value of the pixel is less than a predetermined first threshold, and a difference, "Diff(p)," between a depth value of the pixel, "depth(p)," and the sample-based geometry background model is greater than a predetermined second threshold, the moving object segmenter 1020 may select the pixel as the initial seed point. Here, the difference between the depth value of the pixel and the sample-based geometry background model may be represented by $Diff(p)=|[depth(p)-MIN\_D_{BG(p)}]|$. Here, "$MIN\_D_{BG(p)}$," may denote the smallest depth value of the pixel, "p."

The moving object segmenter 1020 may construct a bad pixel model by indicating a bad pixel based on the obtained depth map and identify an additional initial seed point. When a pixel lacks a valid depth value in a number of successive frames including the pixel, the moving object segmenter 1020 may indicate the pixel as the bad pixel. Also, when the pixel indicated as the bad pixel is covered by a valid foreground pixel in one of the successive frames, for example, when the pixel, "p," is represented by $Depth(p) \epsilon [MIN\_D_{BG}(p), MAX\_D_{BG}(p)]$ in the frame, the moving object segmenter 1020 may restore the pixel to be a foreground pixel point and select the pixel as the initial seed point.

The moving object segmenter 1020 may gather a floor point based on a depth difference in a perpendicular direction of the obtained depth map and remove a background using a floor model on which modeling is performed based on the gathered floor point.

The moving object segmenter 1020 may perform the region growing from each seed point based on a depth of a pixel, grayscale, time information, and an accumulated depth difference on a growing route.

For example, when a difference between a depth value of a growing pixel point, "$x_i$," and a depth value of an adjacent pixel point, "$x_{i+1}$," which is adjacent to the growing pixel point, $x_i$, is less than a predetermined third threshold, a greatest grayscale between $x_i$ and $x_{i+1}$ is less than a predetermined fourth threshold, and the accumulated depth difference on the growing route from $x_i$ to $x_{i+1}$ is less than a predetermined fifth threshold, the moving object segmenter 1020 may perform the region growing from the growing pixel point, $x_i$, to the adjacent pixel point, $x_{i+1}$.

For another example, when $x_i$ and $x_{i+1}$ are verified to be in a static state and different moving objects, the moving object segmenter 1020 may reduce the third threshold, the fourth threshold, and the fifth threshold, and perform the region growing.

Also, with respect to initial regions of the moving object adjacent to one another, without actually being in contact, the moving object segmenter 1020 may identify a portion of the moving object based on the initial regions of the moving object, repeatedly perform the region growing by reducing a set of the third threshold, the fourth threshold, and the fifth threshold, merge the initial regions belonging to the same moving object among obtained initial regions, and obtain an initial region of the moving object.

The image processing device 1000 may further include a display used to display, in various colors, shades, patterns, etc., different human body objects among extracted human body objects.

The image processing device 1000 may extract a human body object from the depth map of the successive 3D image over a period of time obtained by the image depth map acquirer 1010, obtain an additional depth map, and accumulate and extract a new moving object based on the obtained data.

According to one or more embodiments, an image processing device may extract a foreground moving object from a 3D image using only a depth map of a successive 3D image without using color information of the image.

According to one or more embodiments, the image processing device may use only the depth map of the successive 3D image to extract the foreground moving object and thus, a precise and stable image processing effect may be achieved in a noisy environment.

According to one or more embodiments, the image processing device may remove a moving object which is not a human body from moving objects extracted from the depth map of the successive 3D image and thus, the human body object may be extracted without being affected by the noisy environment.

The device described herein may be implemented using hardware components, software components, and combination of both. For example, the hardware components may include microphones, amplifiers, band-pass filters, audio to digital convertors, and processing devices. A processing device may be implemented using one or more general-purpose or special purpose computers, such as, for example, a processor, a controller and an arithmetic logic unit, a digital signal processor, a microcomputer, a field programmable array, a programmable logic unit, a microprocessor or any other device capable of responding to and executing instructions in a defined manner. The processing device may run an operating system (OS) and one or more software applications that run on the OS. The processing device also may access, store, manipulate, process, and create data in response to execution of the software. For purpose of simplicity, the description of a processing device is used as singular; however, one skilled in the art will appreciated that a processing device may include multiple processing elements and multiple types of processing elements. For example, a processing device may include multiple processors or a processor and a controller. In addition, different processing configurations are possible, such a parallel processors.

The software may include a computer program, a piece of code, an instruction, or some combination thereof, to independently or collectively instruct or configure the processing device to operate as desired. Software and data may be embodied permanently or temporarily in any type of machine, component, physical or virtual equipment, computer storage medium or device, or in a propagated signal wave capable of providing instructions or data to or being interpreted by the processing device. The software also may be distributed over network coupled computer systems so that the software is stored and executed in a distributed fashion. The software and data may be stored by one or more non-transitory computer readable recording mediums.

In one or more embodiments, any apparatus, system, element, or interpretable unit descriptions herein include one or more hardware devices or hardware processing elements. For example, in one or more embodiments, any described apparatus, system, element, retriever, pre or post-processing elements, tracker, detector, encoder, decoder, etc., may further include one or more memories and/or processing elements, and any hardware input/output transmission devices, or represent operating portions/aspects of one or more respective processing elements or devices. Further, the term apparatus should be considered synonymous with elements of a physical system, not limited to a single device or enclosure or all described elements embodied in single respective enclosures in all embodiments, but rather, depending on embodiment, is open to being embodied together or separately in differing enclosures and/or locations through differing hardware elements.

In addition to the above described embodiments, embodiments can also be implemented through computer readable code/instructions in/on a non-transitory medium, e.g., a computer readable medium, to control at least one processing device, such as a processor or computer, to implement any above described embodiment. The medium can correspond to any defined, measurable, and tangible structure permitting the storing and/or transmission of the computer readable code.

The media may also include, e.g., in combination with the computer readable code, data files, data structures, and the like. One or more embodiments of computer-readable media include: magnetic media such as hard disks, floppy disks, and magnetic tape; optical media such as CD ROM disks and DVDs; magneto-optical media such as optical disks; and hardware devices that are specially configured to store and perform program instructions, such as read-only memory (ROM), random access memory (RAM), flash memory, and the like. Computer readable code may include both machine code, such as produced by a compiler, and files containing higher level code that may be executed by the computer using an interpreter, for example. The media may also be any defined, measurable, and tangible distributed network, so that the computer readable code is stored and executed in a distributed fashion. Still further, as only an example, the processing element could include a processor or a computer processor, and processing elements may be distributed and/or included in a single device.

The computer-readable media may also be embodied in at least one application specific integrated circuit (ASIC) or Field Programmable Gate Array (FPGA), as only examples, which execute (e.g., processes like a processor) program instructions.

While aspects of the present invention have been particularly shown and described with reference to differing embodiments thereof, it should be understood that these embodiments should be considered in a descriptive sense only and not for purposes of limitation. Descriptions of features or aspects within each embodiment should typically be considered as available for other similar features or aspects in the remaining embodiments. Suitable results may equally be achieved if the described techniques are performed in a different order and/or if components in a described system, architecture, device, or circuit are combined in a different manner and/or replaced or supplemented by other components or their equivalents.

Thus, although a few embodiments have been shown and described, with additional embodiments being equally available, it would be appreciated by those skilled in the art that changes may be made in these embodiments without departing from the principles and spirit of the invention, the scope of which is defined in the claims and their equivalents.

What is claimed is:

1. An image processing device to extract a foreground moving object from a depth map of a three-dimensional (3D) image, the device comprising:
an image depth map acquirer to obtain the depth map of a successive 3D image,
wherein the depth map expresses feature information of a target in the 3D image and comprises a two-dimensional (2D) pixel matrix sign of the 3D image; and
a moving object segmenter to
segment a moving object from the obtained depth map;
construct a background model using the obtained depth map and determine an initial seed point of a foreground object;
obtain a foreground object region by performing region growing from the initial seed point;
obtain an initial region of the moving object by merging foreground object regions belonging to the same moving object among obtained foreground object regions; and
obtain a complete region of the moving object by performing precise segmentation on adjacent initial regions of the moving object exhibiting a complex motion.

2. The device of claim 1, wherein the moving object segmenter is further configured to:
gather a floor point based on a depth difference in a perpendicular direction of the obtained depth map; and
remove a background using a floor model on which modeling is performed based on the gathered floor point.

3. The device of claim 1, wherein the moving object segmenter is further configured to:
construct the background model based on a greatest depth value and a depth value range of a pixel of the obtained depth map; and
select the pixel as the initial seed point when a difference between the greatest depth value and a smallest depth value of the pixel is less than a predetermined first threshold and a difference, "Diff(p)," between a depth value of the pixel, "depth(p)," and the background model is greater than a predetermined second threshold, and
wherein the difference between the depth value of the pixel and the background model is represented by $Diff(p)=|[depth(p)-MIN\_D_{BG(p)}]|$ in which "$MIN\_D_{BG}(p)$" denotes the smallest depth value of the pixel, "p."

4. The device of claim 1, wherein the moving object segmenter is further configured to identify an additional initial seed point by constructing the background model by indicating a bad pixel based on the obtained depth map.

5. The device of claim 4, wherein the moving object segmenter is further configured to:
indicate a pixel as a bad pixel when the pixel lacks a valid depth value in one or more successive frames comprising the pixel; and
select a pixel as the initial seed point by restoring the pixel to be a foreground pixel point when the pixel indicated as the bad pixel is covered by a valid foreground pixel in at least one of the successive frames.

6. The device of claim 1, wherein the moving object segmenter is configured to perform the region growing from a growing pixel point, $X_i$ to an adjacent pixel point, $X_{i+1}$, which is adjacent to the growing pixel point, when a difference between a depth value of $x_{i+1}$, and a depth value of $x_i$ is less than a predetermined third threshold, a greatest depth grayscale between $x_i$ and $x_{i+1}$ is less than a predetermined fourth threshold, and an accumulated depth difference on a growing route from $x_i$ to $x_{i+1}$ is less than a predetermined fifth threshold.

7. The device of claim 6, wherein the moving object segmenter is further configured to reduce the third threshold, the fourth threshold, and the fifth threshold, and performs the region growing, when $x_i$ and $x_{i+1}$ are verified to be in a static state and belonging to different moving objects.

8. The device of claim 6, wherein the moving object segmenter is further configured to:
   identify a portion of the moving object based on each of the initial regions of the moving object adjacent to one another, without actually being in contact;
   perform the region growing repeatedly by reducing a set of the third threshold, the fourth threshold, and the fifth threshold until initial regions of different moving objects are obtained; and
   obtain the initial region of the moving object by merging initial regions belonging to the same moving object among the obtained initial regions.

9. The device of claim 1, further comprising:
   a moving object tracker to identify and track the segmented moving object,
   wherein the moving object segmenter is further configured to:
      extract the moving object from the depth map of the successive 3D image over a period of time obtained by the image depth map acquirer;
      obtain an additional depth map; and
      accumulate and extract a new moving object based on the obtained additional depth map.

10. An image processing method of extracting a foreground moving object from a depth map of a three-dimensional (3D) image, the method comprising:
   obtaining the depth map of a successive 3D image,
   wherein the depth map expresses feature information of a target in the 3D image and comprises a two-dimensional (2D) pixel matrix sign of the 3D image; and
   segmenting a moving object from the obtained depth map;
   constructing a background model using the obtained depth map and determining an initial seed point of a foreground object;
   obtaining a foreground object region by performing region growing from the initial seed point;
   obtaining an initial region of the moving object by merging foreground object regions belonging to the same moving object among obtained foreground object regions; and
   obtaining a complete region of the moving object by performing precise segmentation on adjacent initial regions of the moving object exhibiting a complex motion.

11. The method of claim 10, wherein the constructing and the determining comprises:
   gathering a floor point based on a depth difference in a perpendicular direction of the obtained depth map; and
   removing a background using a floor model on which modeling is performed based on the gathered floor point.

12. The method of claim 10, wherein the constructing and the determining comprises:
   constructing the background model based on a greatest depth value of the obtained depth map and a depth value range of a pixel of the obtained depth map; and
   selecting the pixel as the initial seed point when a difference between the greatest depth value of the obtained depth map and a smallest depth value of the pixel is less than a predetermined first threshold and a difference, "Diff(p)," between a depth value of the pixel, "depth(p)," and the background model is greater than a predetermined second threshold, and
   wherein the difference between the depth value of the pixel and the background model is represented by $\text{Diff}(p) = |[\text{depth}(p) - \text{MIN\_D}_{BG(p)}]|$ in which "$\text{MIN\_D}_{BG}(p)$" denotes the smallest depth value of the pixel, "p."

13. The method of claim 10, wherein the constructing and the determining comprises:
   identifying an additional initial seed point by constructing the background model by indicating a bad pixel based on the obtained depth map.

14. The method of claim 13, wherein the identifying comprises:
   indicating a pixel as a bad pixel when the pixel lacks a valid depth value in one or more successive frames comprising the pixel; and
   selecting the pixel as the initial seed point by restoring the pixel to be a foreground pixel point when the pixel indicated as the bad pixel is covered by a valid foreground pixel in at least one of the successive frames.

15. The method of claim 10, wherein the obtaining of the foreground object region comprises:
   performing the region growing from a growing pixel point, "$x_i$," to an adjacent pixel point, "$x_{i+1}$," which is adjacent to the growing pixel point, when a difference between a depth value of $x_{i+1}$ and a depth value of $x_i$ is less than a predetermined third threshold, a greatest depth grayscale between $x_i$ and $x_{i+1}$ is less than a predetermined fourth threshold, and an accumulated depth difference on a growing route from $x_i$ to $x_{i+1}$ is less than a predetermined fifth threshold.

16. The method of claim 15, wherein the performing of the region growing from $x_i$ to $x_{i+1}$ comprises:
   reducing the third threshold, the fourth threshold, and the fifth threshold, and performing the region growing when $x_i$ and $x_{i+1}$ are verified to be in a static state and belonging to different moving objects.

17. The method of claim 15, wherein the obtaining of the complete region comprises:
   identifying a portion of the moving object based on each of the initial regions of the moving object adjacent to one another, without actually being in contact;
   performing the region growing repeatedly by reducing a set of the third threshold, the fourth threshold, and the fifth threshold until initial regions of different moving objects are obtained; and
   obtaining the complete region of the moving object by merging initial regions belonging to the same moving object among the obtained initial regions.

18. The method of claim 10, further comprising:
   identifying and tracking the segmented moving object; and
   obtaining an additional depth map based on data obtained by identifying and tracking the segmented moving object from the obtained depth map, and accumulating and extracting a new moving object based on the obtained additional depth map.

19. The method of claim 10, wherein the merging foreground object regions comprises:
   projecting a first pixel set of a first foreground object region among the foreground object regions on an XY plane and projecting a second pixel set of a second foreground object region among the foreground object regions on an XZ plane;
   calculating a Euclidean distance between the projected first and second pixel sets;
   calculating an overlapping area of the projected first and second pixel sets; and
   merging the first foreground object region and the second foreground object region based on a comparison of the calculated distance to a sixth predetermined threshold and a comparison of the calculated area to a seventh predetermined threshold.

20. The method of claim 10, wherein the merging foreground object regions comprises:

projecting a first pixel set of a first foreground object region among the foreground object regions on an XY plane and projecting a second pixel set of a second foreground object region among the foreground object regions on an XZ plane;

calculating a Hausdorff distance between the projected first and second pixel sets; and merging the first foreground object region and the second foreground object region when the calculated Hausdorff distance is less than an eighth predetermined threshold.

21. The method of claim 10, wherein the merging foreground object regions comprises:

projecting a first pixel set of a first foreground object region among the foreground object regions on an XY plane and projecting a second pixel set of a second foreground object region among the foreground object regions on an XZ plane;

calculating an overlapping area of the projected first and second pixel sets using a bounding box;

merging the first foreground object region and the second foreground object region when the calculated overlapping area greater than a ninth predetermined threshold.

22. The method of claim 10, wherein the merging foreground object regions comprises:

merging the first foreground object region and the second foreground object region when the smaller of the first foreground object region and the second foreground object region is positioned within a convex hull of the larger of the first foreground object region and the second foreground object region.

* * * * *